United States Patent
Huang et al.

(10) Patent No.: US 6,886,174 B2
(45) Date of Patent: Apr. 26, 2005

(54) OPTICAL DISK DRIVE MODULE FOR LIFTING UP AND LOWERING A DISK DRIVE

(75) Inventors: Chin-Chuan Huang, Taipei Hsien (TW); Chin-Yi Ko, Taipei (TW)

(73) Assignee: Wistron Corporation, Hsi-Chih (TW)

( * ) Notice: Subject to any disclaimer, the term of this patent is extended or adjusted under 35 U.S.C. 154(b) by 256 days.

(21) Appl. No.: 10/063,948

(22) Filed: May 28, 2002

(65) Prior Publication Data

US 2003/0063547 A1 Apr. 3, 2003

(30) Foreign Application Priority Data

Sep. 28, 2001 (TW) ........................................ 90124208 A (51) Int. Cl.[7] .......................... G11B 17/03; G11B 17/04; G11B 33/02
(52) U.S. Cl. ....................................................... 720/600
(58) Field of Search ................................ 361/681, 683, 361/686; 312/223.1, 223.2; 369/75.11; 720/600, 602, 605, 612, 646, 647, 653, 654, 652, 655, 657

(56) References Cited

U.S. PATENT DOCUMENTS

| | | | | |
|---|---|---|---|---|
| 6,445,576 B1 | * | 9/2002 | Wooden et al. | 361/683 |
| 6,519,138 B1 | * | 2/2003 | Olson et al. | 361/683 |
| 6,657,857 B1 | * | 12/2003 | Lan | 361/685 |
| 6,680,843 B1 | * | 1/2004 | Farrow et al. | 361/681 |

* cited by examiner

*Primary Examiner*—Julie Anne Watko
(74) *Attorney, Agent, or Firm*—Winston Hsu (57) ABSTRACT

An optical disk drive module installed in a flat panel display personal computer is provided for lifting up and lowering a disk drive. The optical disk drive module includes a chassis module and a drive carrier. The chassis module is disposed at a rear side of a flat panel display of the flat panel display personal computer. The drive carrier is rotatably disposed in the chassis module for positioning the disk drive. A user can utilize the optical disk drive module to raise up the disk drive so as to position the disk drive at the rear side of the flat panel display. Similarly, the user can also utilize the optical disk drive module to lower the disk drive so as to expose the disk drive below the flat panel display.

9 Claims, 9 Drawing Sheets

OPTICAL DISK DRIVE MODULE FOR LIFTING UP AND LOWERING A DISK DRIVE

BACKGROUND OF INVENTION

1. Field of the Invention

The present invention relates to an optical disk drive module, and more specifically, the present invention discloses an optical disk drive module for lifting up and lowering a disk drive.

2. Description of the Prior Art

In general, a desktop computer includes a display device and a computing module coupled with the display device. As a result of a separating design between the computing module and the display device, the desktop computer thus occupies a lot of space. Therefore, a liquid crystal display personal computer (LCD PC) is widely used for combining the computing module with the display device so as to occupy less space than the desktop computer.

Figure 1:
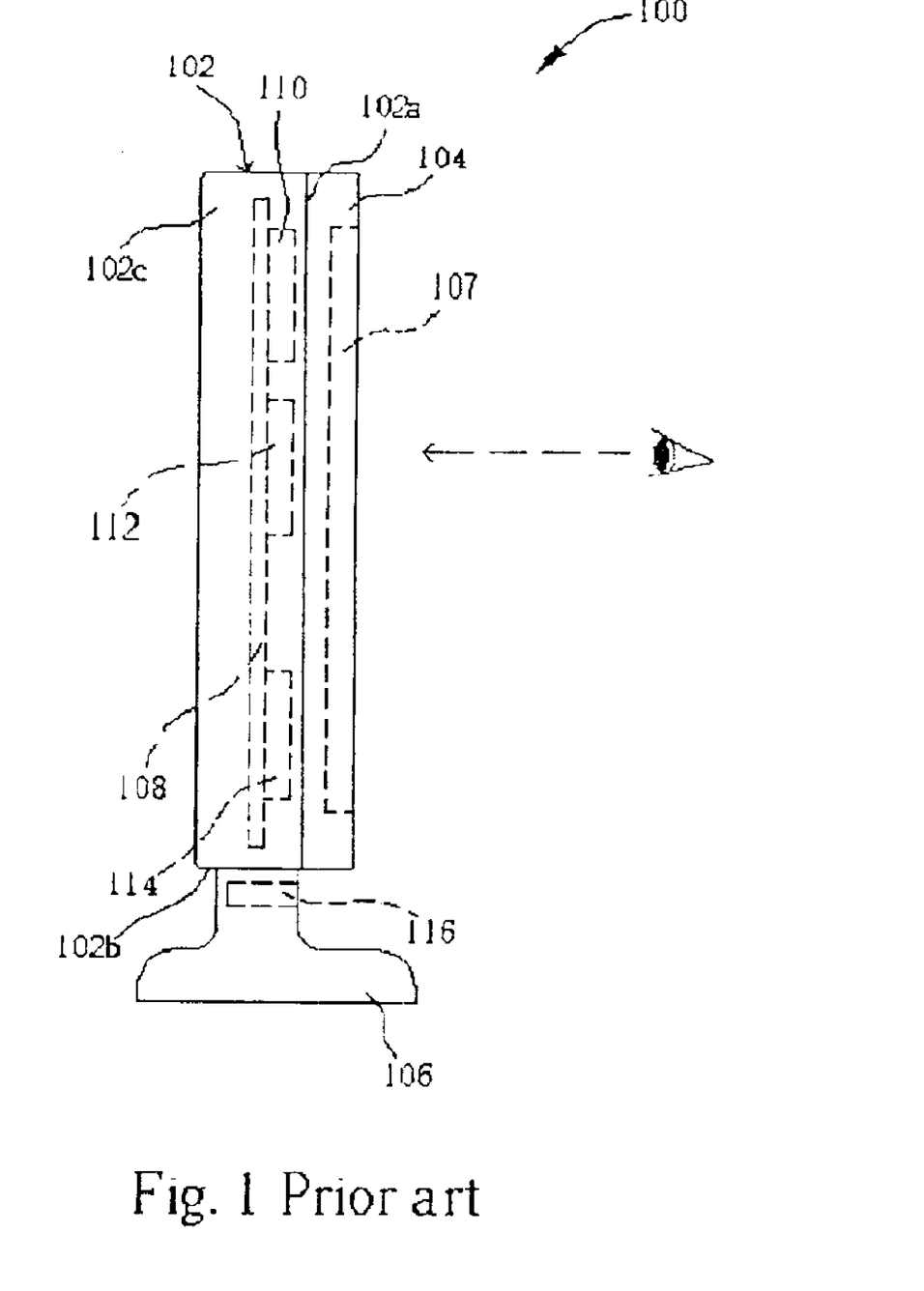
FIG. 1 is a side view of a flat panel display personal computer according to the art.

Please refer to FIG. 1. FIG. 1 is a side view of a flat panel display personal computer 100 according to the prior art. The flat panel display personal computer 100 comprises a computing module 102, a flat panel display 104, and a chassis 106. A rear side of the flat panel display 104 is coupled with a side plate 102a of the computing module 102, and a bottom plate 102b of the computing module 102 is disposed on the chassis 106 so as to allow the chassis 106 to support the computing module 102 and the flat panel display 104. An LCD panel 107 is disposed at a front side of the flat panel display 104 for displaying image frames of the flat panel display personal computer 100. The computing module 102 comprises a motherboard 108, a central processing unit (CPU) 110, a random access memory (RAM) 112, and a hard disk 114. The CPU 110, the RAM 112, and the hard disk 114 are all coupled with the motherboard 108. The CPU 110 is used to process information and data of the flat panel display personal computer 100, the RAM 112 is used to register the information and data for processing by the CPU 110, and the hard disk 114 is used to store the data.

The chassis 106 has an optical disk drive 116 installed inside the chassis 106 for accessing data of an optical disc positioned within the optical disk drive 116. However, the optical disk drive engages with the chassis 106 via a number of screws, meaning that a user must utilize a screwdriver or other auxiliary tools to install or detach the optical disk drive 116. If threads of the screws become worn or rusted, the user must spend more energy and time on installing and detaching the optical disk drive 116. Although the user can directly access the optical disk drive 116 at a right side of the flat panel display personal computer 100, it is a blemish in an otherwise perfect design that the optical disk drive 116 cannot be hidden at the rear side of the flat panel display 104 while accessing the data of the optical disc.

SUMMARY OF INVENTION

It is therefore a primary objective of the claimed invention to provide an optical disk drive module. The optical disk drive module is installed in a flat panel display personal computer for hiding the optical disk drive at a rear side of the flat panel display while accessing data of an optical disc so as to reduce occupied space of hardware. Furthermore, when a user wishes to operate the optical disk drive, the user can also utilize the optical disk drive module to lower the optical disk drive.

The claimed invention, briefly summarized, discloses an optical disk drive module installed in a flat panel display personal computer for lifting up and lowering a disk drive. The optical disk drive module comprises a chassis module and a drive carrier. The chassis module is disposed at a rear side of a flat panel display of the flat panel display personal computer. The drive carrier is rotatably disposed in the chassis module for positioning the disk drive. A user can utilize the optical disk drive module to raise up the disk drive so as to position the disk drive at the rear side of the flat panel display. Similarly, the user can also utilize the optical disk drive module to lower the disk drive so as to expose the disk drive below the flat panel display.

It is an advantage of the claimed invention that the claimed flat panel display personal computer can conceal the disk drive at the rear side of the flat panel display when the disk drive accesses an optical disc or is in a waiting state so as to reduce space occupied by hardware. It is also an advantage that the flat panel display personal computer can utilize the optical disk drive module to lower the disk drive so as to expose the disk drive at the front side of the flat panel display.

These and other objectives and advantages of the claimed invention will no doubt become obvious to those of ordinary skill in the art after reading the following detailed description of the preferred embodiment that is illustrated in the various figures and drawings.

DETAILED DESCRIPTION

The present invention provides an optical disk drive module installed in a flat panel display personal computer for lifting up and lowering a disk drive. The flat panel display personal computer comprises a flat panel display and a computing module coupled with a rear side of the flat panel display.

The optical disk drive module comprises a chassis module, a drive carrier, and a cover. The chassis module is moveably disposed at the rear side of the flat panel display and has a chassis body. The drive carrier is rotatably disposed in the chassis module. The cover is fixed outside the disk drive and slidably fastened within the drive carrier so as to position the disk drive inside the drive carrier. When the drive carrier swings away from the chassis module, the optical disk drive module will lower the disk drive to expose the disk drive below the flat panel display. When the drive carrier moves toward the chassis module, the optical disk drive module will lift up the disk drive to position the disk drive at the rear side of the flat panel display.

Figure 2:
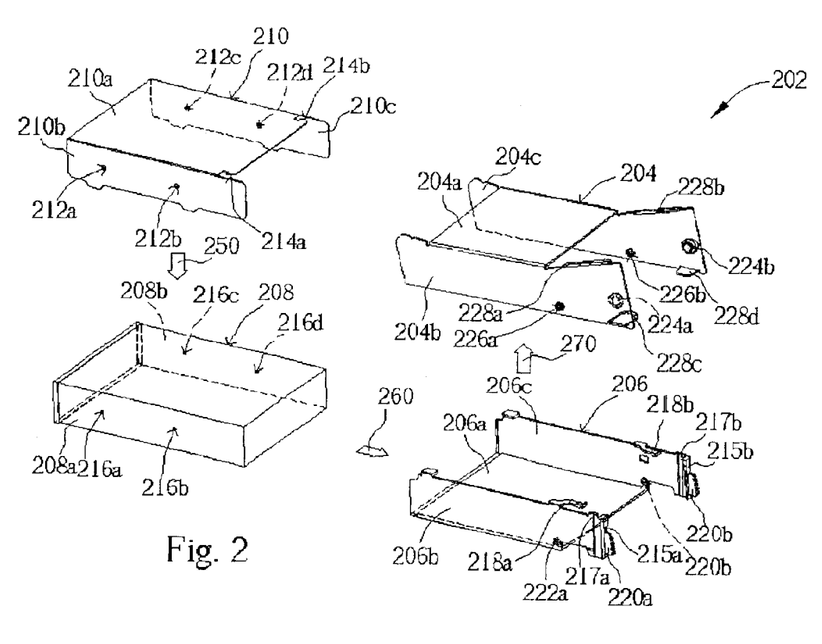
FIG. 2 is an exploded diagram of an optical disk drive module according to a preferred embodiment of the present invention.
Figure 3:
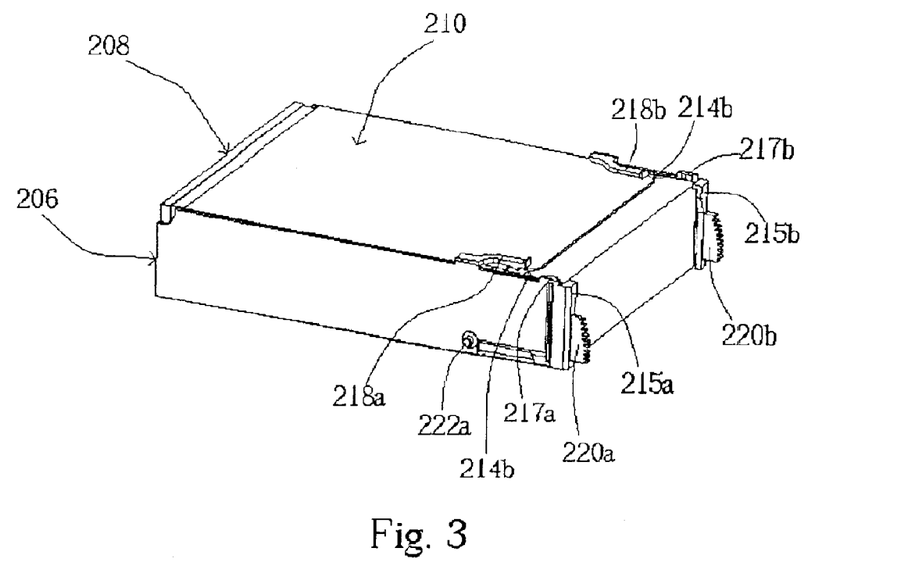
FIG. 3 is a perspective view of a disk drive fabricated with a cover and a drive carrier.

Please refer to FIG. 2 and FIG. 3. FIG. 2 is an exploded diagram of an optical disk drive module 202 according to a preferred embodiment of the present invention. FIG. 3 is a perspective view of a disk drive fabricated with a cover and a drive carrier depicted in FIG. 2. As shown in FIG. 2, the optical disk drive module 202 comprises a chassis module 204, a drive carrier 206, a disk drive 208, and a cover 210.

The cover 210 comprises a cover body 210a and two side plates 210b and 210c. The cover body 210a and the side plates 210b, 210c can be formed in rectangular shapes. The side plates 210b and 210b are respectively formed at two sides of the cover body 210a for forming the U-shape cover 210 with the cover body 210a. Of course, the cover body 210a and the side plates 210b, 210c can also be formed monolithically. The side plate 210b has two openings 212a and 212b, and the side plate 210c also has two openings 212c and 212d. The cover body 210a has two positioning slots 214a and 214b positioned on a lower-right end and an upper-right end, respectively, for fastening with the drive carrier 206.

Furthermore, the disk drive 208 comprises a side plate 208a with two fixing openings 216a and 216b, which are located corresponding to the openings 212a and 212b. The disk drive 208 also has a side plate 208b opposite to the side plate 208a with two fixing openings 216c and 216d, which are located corresponding to the openings 212c and 212d.

When a user places the cover 210 onto the disk drive 208 along an arrow direction 250, the openings 212a, 212b, 212c, and 212d exactly correspond to the fixing openings 216a, 216b, 216c, and 216d, respectively. Then, the user can utilize four screws to respectively pass through the openings 212a, 212b, 212c, and 212d and tightly lock the fixing openings 216a, 216b, 216c, and 216d, allowing the cover 210 to be detachably disposed on the disk drive 208.

It needs to be noted that the cover 210 is formed according to a shape of the disk drive 208, and locations and numbers of the openings of the cover 210 are in accordance with the locations and numbers of the fixing openings of the disk drive 208. The disk drive 208 can also be monolithically formed with the cover 210. Furthermore, a user can insert an optical disc from a left side of the disk drive 208. For example, the disk drive 208 has a retractable tray (not shown) moveably installed within the disk drive 208 to allow insertion of an optical disc, which will be accessed by the disk drive 208 after the tray has entered the disk drive 208.

The drive carrier 206 comprises a carrier body 206a and two side plates 206b and 206c respectively formed at two sides of the carrier body 206a for forming the U-shape drive carrier 206 with the carrier body 210a. Of course, the carrier body 206a and the side plates 206b and 206c can be formed in rectangular shapes and be monolithically formed. The side plate 206b has a positioning hook 218a positioned at an upper end of the side plate 206b, and the side plate 206c also has a positioning hook 218b positioned at an upper end of the side plate 206c. The positioning hooks 218a and 218b are used to respectively engage with the positioning slots 214a and 214b of the cover 210. Furthermore, right ends of the side plates 206b and 206c are both stretched out of the carrier body 206a and respectively have two stoppers 215a and 215b for pushing against a right side of the disk drive 208 and for further positioning the disk drive 208 so as to prevent the disk drive 208 from separating from the drive carrier 206.

After the cover 210 is positioned onto the disk drive 208, the user pushes the disk drive 208 to slide into the drive carrier 206 along an arrow direction 260. After performing the aforementioned installation process, the positioning hooks 218a and 218b will exactly engage with the positioning slots 214a and 214b, the positioning hooks 218c and 218d will push against the left sides of the cover 210 and the disk drive 208, and the stoppers 215a and 215b will push against the right side of the disk drive 208 so as to slidably engage the cover 210 within the drive carrier 206 and to expose the switch hook 213 outside the drive carrier 206.

As shown in FIG. 3, the disk drive 208 therefore can be slidably fastened within the drive carrier 206 via the cover 210. It needs to be noted that the present invention can also design the positioning slots corresponding to the positioning hooks 218a and 218b to reduce production costs of the cover 210. The user can directly insert a disk drive with positioning slots into the drive carrier 206, and the positioning hooks 218a and 218b will engage with the positioning slots of the disk drive so as to achieve a positioning effect. Additionally, the disk drive 208 and the drive carrier 206 can also be positioned using other engaging methods. That is, if the disk drive 208 needs to be detached from the drive carrier 206, the user only needs to release the positioning hooks 218a and 218b of the drive carrier 206, and the disk drive 208 can be pulled out of the drive carrier 206.

As shown in FIG. 2 and FIG. 3, a right end of the side plate 206b has a gear 220a positioned outside the stopper 215a, and a right end of the side plate 206c has a gear 220b positioned outside the stopper 215b. Furthermore, the side plates 206b and 206c further comprise two protruded portions 222a and 222b, respectively, for engaging with the chassis module 204, and two protruded pieces 217a and 217b respectively positioned at upper ends of the side plates 206b and 206c.

The chassis module 204 comprises a chassis body 204a, and two side plates 204b and 204c. The chassis body 204a and the side plates 204b and 204c can be formed in rectangular shapes. The side plates 204b and 204c are respectively formed at two sides of the chassis body 204a for forming the U-shape chassis module 204 with the chassis body 204a. Of course, the chassis body 204a, and the side plates 204b and 204b can also be formed monolithically. Right ends of the side plates 204b and 204c are both stretched out of the chassis body 204a. Additionally, a gearwheel 224a is disposed on an inner wall of the right side of the side plate 206b for rotatably engaging with the gear 220a, and a gearwheel 224b facing the gearwheel 224a is disposed on an inner wall of the right side of the side plate 206c for rotatably engaging with the gear 220b.

It needs to be noted that the present invention can add retarding oil into the two gearwheels 224a and 224b for adjusting rotational speed of the gearwheels 224a and 224b. When too much retarding oil is added, the gearwheels 224a and 224b will rotate slowly, and when too little retarding oil is added, the gearwheels 224a and 224b will rotate fast. Furthermore, the side plates 204b and 204c have two apertures 226a and 226b for fastening to the protruded portions 226a and 226b, respectively.

Figure 4:
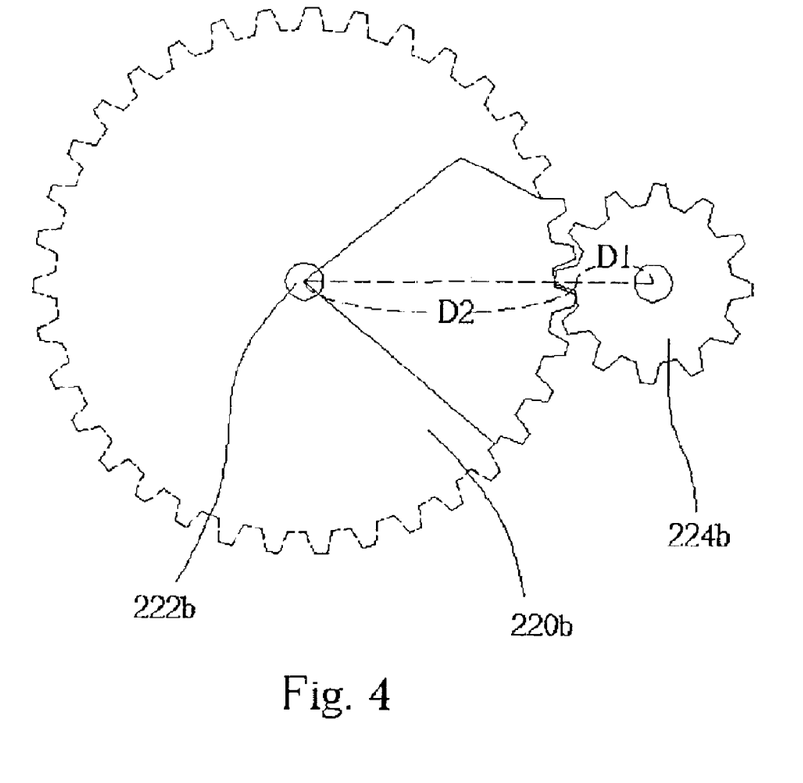
FIG. 4 is an amplified view of a gearwheel engaging with a gear.

Please refer to FIG. 4. FIG. 4 is an amplified view of the gearwheel 224b engaging with the gear 220b. As shown in FIG. 4, the gearwheel 224b is a perfect gear wheel and has a rotational radius D1 and a number of teeth T1. The gear 220b is a segmental gear wheel rotating with respect to the protruded portion 222b and has a rotational radius D2 and a number of teeth T2. If the gearwheel 224b and the gear 220b have respective rotational speeds V1 and V2, the ratio of V2/V1 is effectively equal to the ratio of D2/D1 and is also equal to the ratio of T2/T1. To achieve an effect of deceleration when the drive carrier 204 is in an open state, the present invention must design the value of V1 to be less than the value of V2. Of course, the values of D2 and T2 are also larger than the values of D1 and T1, respectively. Similarly, the present invention must design a rotational radius of the gear 220a to be larger than a rotational radius of the gearwheel 224a. Furthermore, the gears 220a and 220b have effectively equal radii D2, and the gearwheels 224a and 224b also have effectively equal radii D1.

It needs to be noted that the total number of teeth of the gears 220a and 220b must be designed to be enough for respectively engaging with the gearwheels 224a and 224b when the drive carrier 206 is not enclosed.

Figure 5:
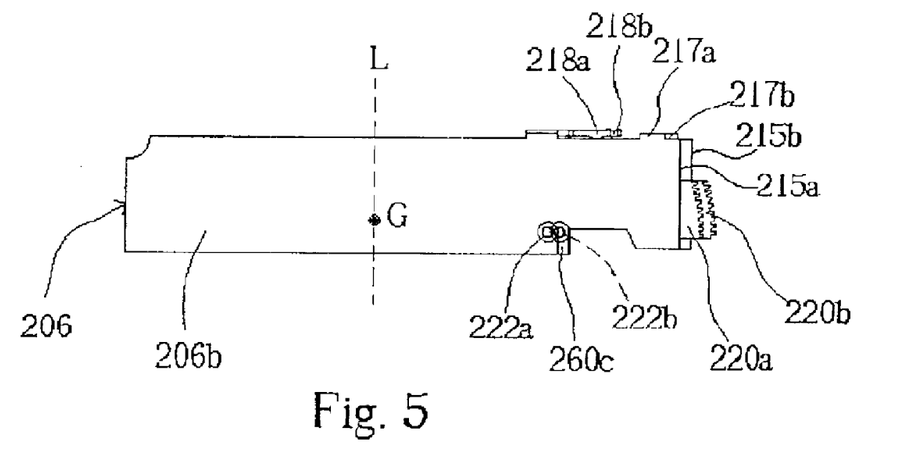
FIG. 5 is an amplified side view of two gears when the two gears are staggered.

Please refer to FIG. 5. FIG. 5 is an amplified side view of the two gears 220a and 220b when the two gears 220a and 220b are staggeringly installed. To maintain constant opening and closing speeds, the present invention especially disposes the gears 220a and 220b staggeringly so as to prevent the drive carrier 206 from having unstable opening and closing speeds. As shown in FIG. 5, if the drive carrier 206 has a center of gravity G located at a central line L of the drive carrier 206, the present invention must design the protruded portion 222a to be positioned between the center of gravity G and the gear 220a. Similarly, the protruded portion 222b of FIG. 2 must be positioned between the center of gravity G and the gear 220b. Therefore, the drive carrier 206 will rotate by using the protruded portions 222a and 222b as pivots to move downward slowly due to the gravity of the drive carrier 206 itself. Simultaneously, the gears 220a and 220b can rotate with respect to the protruded portions 222a and 222b function as the pivots to move upward slowly, and further drive the gearwheels 224a and 224b to rotate.

To control retractable extent of the drive carrier 206, the present invention provides two chassis stoppers 228a and 228b respectively disposed on the upper ends of the side plates 204b and 204c to push against the protruded pieces 217a and 217b after the drive carrier 206 is swung away from the chassis module 204. The present invention further provides two chassis stoppers 228c and 228d respectively disposed on the lower ends of the side plates 204b and 204c to push against the gears 220a and 220b after the drive carrier 206 is swung toward the chassis module 204. Therefore, the chassis stoppers 228a, 228b, 228c, and 228d are used to control swinging angles of the drive carrier 206 and maintain engaging states of the gears 220a and 220b engaging with the gearwheels 224a and 224b.

After the user places the drive carrier 206 within the chassis module 204 along an arrow direction 270, the gears 220a and 220b are respectively engaged with the gearwheels 224a and 224b, and the protruded portions 222a and 222b are respectively engaged with the apertures 226a and 226b so as to detachably dispose the drive carrier 206 within the chassis module 204. That is, the optical disk drive module 202 is formed by the chassis module 204, drive carrier 206, the disk drive 208, and the cover 210.

Figure 6:
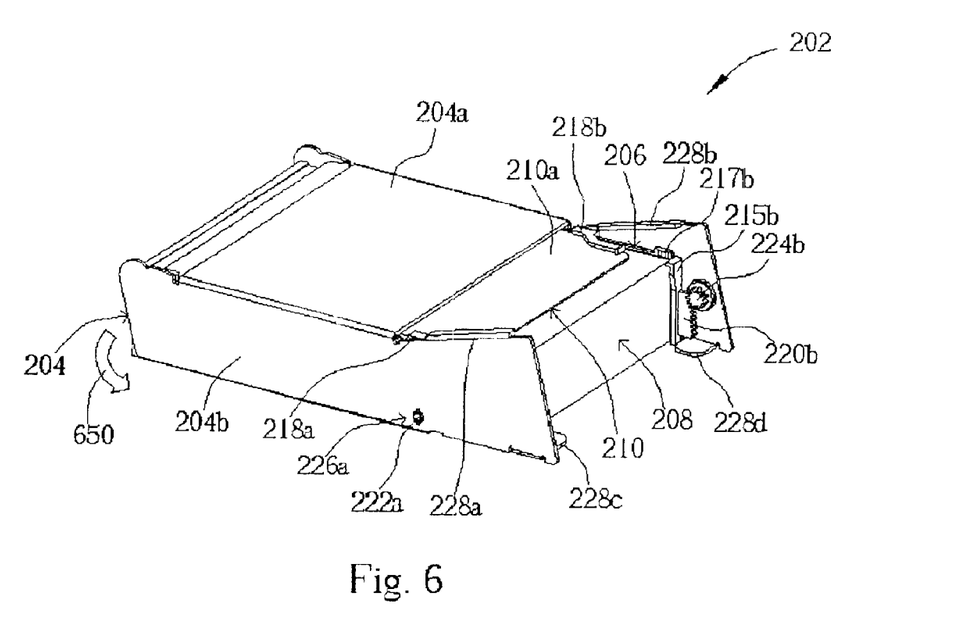
FIG. 6 is a perspective view of the optical disk drive module when the optical disk drive module is enclosed.

Please refer to FIG. 6. FIG. 6 is a perspective view of the optical disk drive module 202 when the optical disk drive module 202 is enclosed. As shown in FIG. 6, the cover 210 is secured onto the disk drive 208, the disk drive 208 is engaged within the drive carrier 206 via the cover 210, and the drive carrier 206 joins with the chassis module 204. When the drive carrier 206 is enclosed, that is, when the cover body 210a is parallel with the chassis body 204a, or the lower side of the side plate 206b overlaps with the lower side of the side plate 204b, teeth of an upper portion of the gear 220b are engaged with the gearwheel 224b, and a lower portion of the gear 220b is pushed against the chassis stopper 228d. Of course, teeth of an upper portion of the gear 220a are also engaged with the gearwheel 224a, and a lower portion of the gear 220a is pushed against the chassis stopper 228c. If a user takes a look at the optical disk drive module 202 from the left side of the optical disk drive module 202, the user can notice that the disk drive 208 and the drive carrier 206 form a streamline-shape mechanism with the chassis module 204. Furthermore, the user can also install a fastening switch on an upper end of the optical disk drive module 202 to engage with the carrier body 206a and the cover body 204a to display the enclosed state of the optical disk drive module 202.

The disk drive 208 and the cover 210 are both disposed within the drive carrier 206, so when the user unlocks the fastening switch, the drive carrier 206, the disk drive 208, and the cover 210 will slowly rotate along an arrow direction 650 by using the protruded portions 222a and 222b as pivots. The gears 220b and 220a will relatively rotate with the gearwheels 224b and 224a. Since the rotational radii of the gears 220a and 220b are larger than the rotational radii of the gearwheels 224a and 224b, and the retarding oil is added into the gearwheels 224a and 224b, the drive carrier 206 is rotated smoothly.

During a slow rotating process of the drive carrier 206 rotating along the arrow direction 650, the protruded pieces 217a and 217b will push against the chassis stoppers 228a and 228b to make the drive carrier 206 stop moving so as to allow the disk drive 208 to be used by the user. Furthermore, the gears 220a and 220b will respectively engage with the gearwheels 224a and 224b to display the open state of the optical disk drive module 202.

Figure 7:
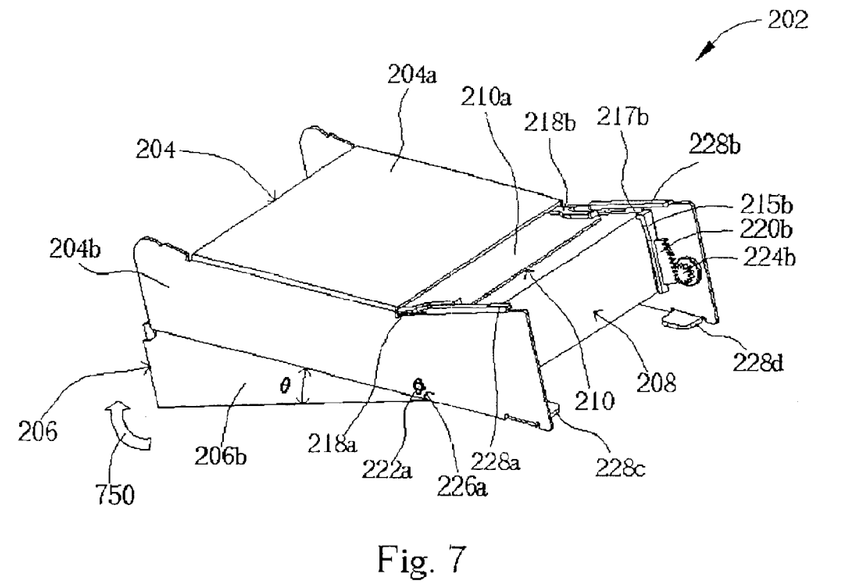
FIG. 7 is a perspective view of the optical disk drive module when the optical disk drive module is not enclosed.

Please refer to FIG. 7. FIG. 7 is a perspective view of the optical disk drive module 202 when the optical disk drive module 202 is not enclosed. As shown in FIG. 7, the cover body 210a forms an angle with the chassis body 204a. That is, the lower end of the side plate 206b forms an angle θ with the lower end of the side plate 204b. Of course, the user can also slowly move the drive carrier 206 upward along an arrow direction 750 so as to allow the drive carrier 206 to slowly rotate with respect to the protruded portions 222a and 222b along the arrow direction 750. Then, the optical disk drive module 202 will be restored to the enclosed state as shown in FIG. 6. Additionally, the user can also lock the fastening switch locating on the upper end of the optical disk drive module 202 to fasten to the carrier body 206a and the chassis body 204a so as to prevent the protruded portions 222a and 222b from swinging away from the chassis module 204.

Figure 8:
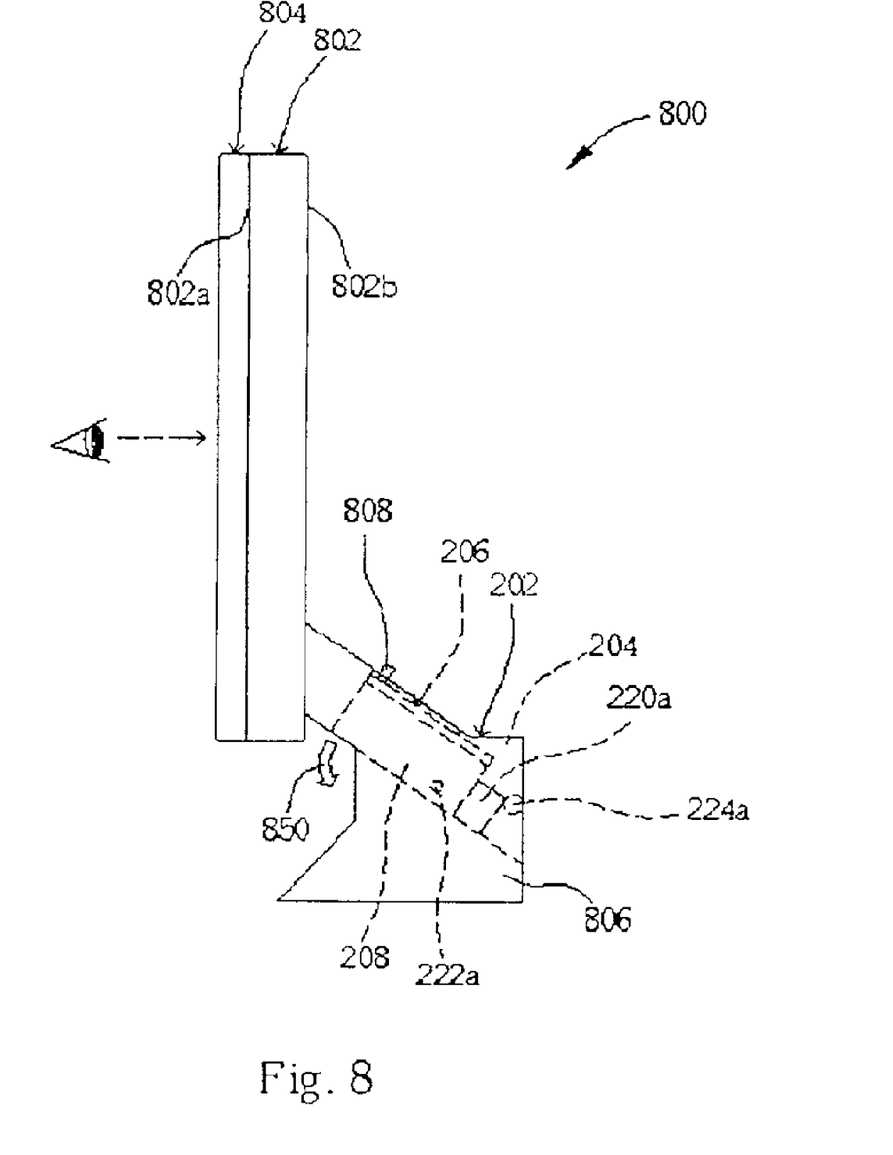
FIG. 8 is a perspective view of a flat panel display personal computer with the optical disk drive module when the optical disk drive module is enclosed.

The optical disk drive module 202 can also be installed in a flat panel display personal computer. Please refer to FIG. 8. FIG. 8 is a perspective view of a flat panel display personal computer 800 with the optical disk drive module 202 depicted in FIG. 6. As shown in FIG. 8, the flat panel display personal computer 800 comprises a computing module 802, a flat panel display 804, a chassis 806, and the optical disk drive module 202. A rear side of the flat panel display 804 is fastened with a side plate 802a of the computing module 802, and a side plate 802b of the computing module 802 is disposed on the chassis 806 so as to allow the chassis 806 to support the computing module 802 and the flat panel display 804, and to allow the flat panel display personal computer 800 to stably stand on a top of a table.

The present optical disk drive module 202 can also be installed at a rear side of the flat panel display 804 or within the chassis 806. If the optical disk drive module 202 is installed at the rear side of the flat panel display 804, left sides of the side plates 204b and 204c are fastened to the rear side of the flat panel display 804. The present invention will use the optical disk drive module 202 installed within the chassis 806 as an example. When a user takes a look at the flat panel display personal computer 800 from a left side of the flat panel display personal computer 800, the disk drive 208 is positioned at the rear side of the flat panel display 804 so that the user cannot see the disk drive 208. The characteristic allows the flat panel display personal computer 800 to have a more streamlined shape than the flat panel display personal computer 100 depicted in FIG. 1. Of course, the present invention can also install a fastening switch 808 on the optical disk drive module 202 for fastening with the drive carrier 206 and the chassis module 204, so as to maintain the closed state the optical disk drive module 202.

When the user wishes to use the disk drive 208, the user only needs to unlock the fastening switch 808 so as to allow the drive carrier 206 with the disk drive 208 to rotate by using the protruded portion 222a as a pivot to slowly move downward along an arrow direction 850. In addition, design of the gear 220a and the gearwheel 224a will enable the drive carrier 206 and the disk drive 208 to smoothly move downward. Of course, the disk drive 208 will be exposed below the flat panel display 804 to allow the user to see the disk drive 208 from the left side of the flat panel display personal computer 800 as shown in FIG. 9, and to directly place an optical disc on the disk drive 208.

Figure 9:
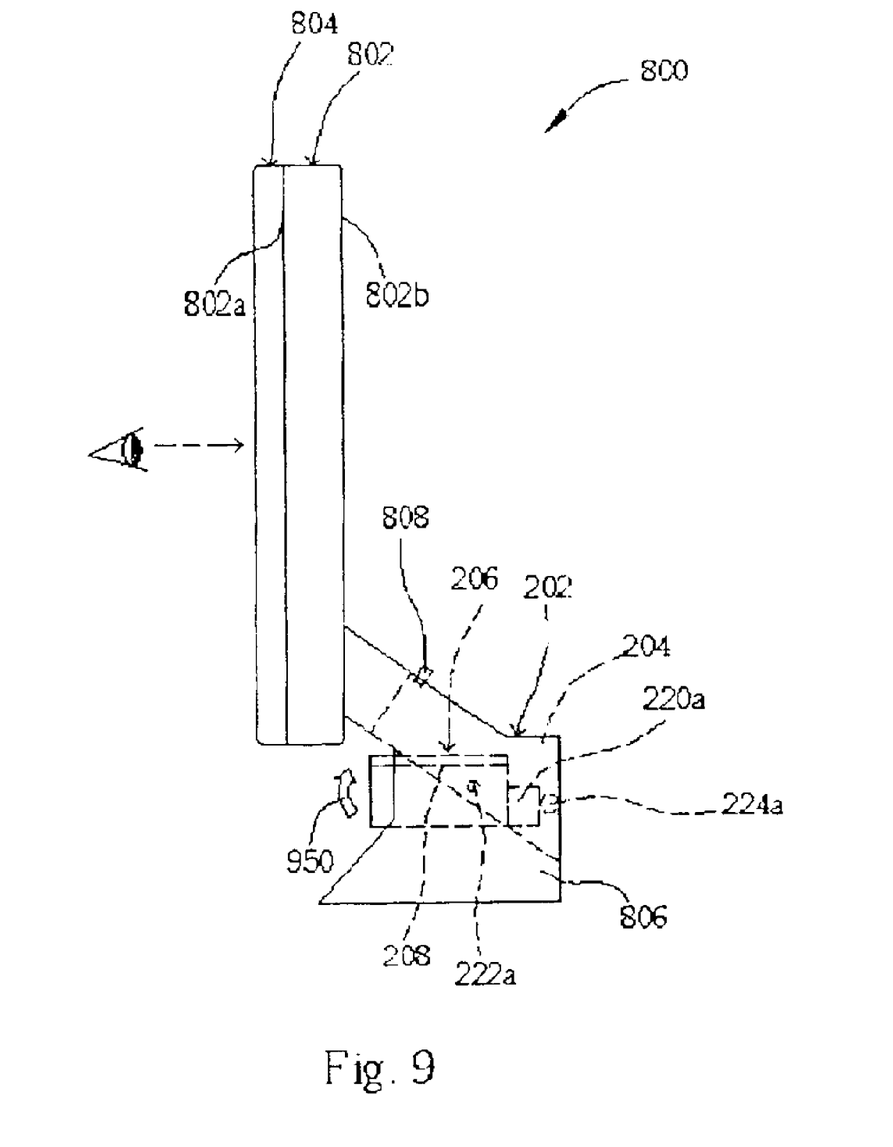
FIG. 9 is a perspective view of a flat panel display personal computer with the optical disk drive module when the optical disk drive module is not enclosed.

Please refer to FIG. 9. FIG. 9 is a perspective view of the flat panel display personal computer 800 with the optical disk drive module 202 when the optical disk drive module 202 is not enclosed. As shown in FIG. 9, after the user places the optical disc inside the disk drive 208, the user can push the drive carrier 206 and the disk drive 208 upward slowly along an arrow direction 950 so as to allow the fastening switch 808 to engage the drive carrier 206 with the chassis module 204 as shown in FIG. 8. Then, the optical disc can be accessed, and the disk drive 208 is concealed at the rear side of the flat panel display.

Technologies of the present invention are not limited by the above description. For example, the disk drive 208 can be a CD-ROM drive, a DVD-ROM player, a CD burner, a DVD-ROM burner, or a portable hard disk.

In contrast to the prior art, the present flat panel display personal computer can conceal the disk drive at the rear side of the flat panel display when the disk drive accesses an optical disc or is in a waiting state so as to reduce space occupied by hardware. The flat panel display personal computer can also utilize the optical disk drive module to lower the disk drive so as to show the disk drive at the front side of the flat panel display.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical disk drive module installed in a flat panel display personal computer for lifting up and lowering a disk drive, the flat panel display personal computer comprising a flat panel display, the optical disk drive module comprising:
   a chassis module disposed at a rear side of the flat panel display, the chassis module comprising:
      a chassis body;
      a first side plate and a second side plate formed at two sides of the chassis body and movably fastened to the rear side of the flat panel display, the first side plate having a first aperture, the second side plate having a second aperture facing the first aperture;
      a first gearwheel disposed on an inner wall of the first side plate; and
      a second gearwheel disposed on an inner wall of the second side plate facing the first gear, the first and second gearwheels having effectively equal radii D1; and
   a drive carrier rotatably disposed in the chassis module for positioning the disk drive, the drive carrier comprising:
      a carrier body; and
      a first side plate and a second side plate formed at two sides of the carrier body, the first side plate having a first protruded portion inserted into the first aperture of the first side plate of the chassis module, the second side plate having a second protruded portion inserted into the second aperture of the second side plate of the chassis module;
   wherein when the drive carrier swings away from the chassis module, the optical disk drive module will lower the disk drive to expose the disk drive below the flat panel display; and when the drive carrier moves toward the chassis module, the optical disk drive module will lift up the disk drive to position the disk drive at the rear side of the flat panel display.

2. The optical disk drive module of claim 1 wherein:
   the drive carrier further comprises:
      a first positioning hook positioned at an upper end of the first side plate, and a second positioning hook positioned at an upper end of the second side plate;
      a first gear disposed at one end of the first side plate for engaging with the first gearwheel; and
      a second gear disposed at one end of the second side plate opposing the first gear for engaging with the second gearwheel, the first and second gears having effectively equal radii D2 which is larger than D1;
   wherein when the drive carrier rotates with respect to the first protruded portion and the second protruded portion to swing away from the chassis module, the optical disk drive module will lower the disk drive to expose the disk drive below the flat panel display; and when the drive carrier rotates with respect to the first protruded portion and the second protruded portion to swing toward the chassis module, the optical disk drive module will raise up the disk drive to position the disk drive at the rear side of the flat panel display.

3. The optical disk drive module of claim 2 further comprising a cover slidably fastened within the drive carrier, the cover comprising:
   a cover body having a first positioning slot for receiving the first positioning hook, and a second positioning slot for receiving the second positioning hook so as to fasten the cover within the drive carrier; and
   a first side plate and a second side plate formed at two sides of the cover and outside of the disk drive so as to fix the cover outside of the disk drive, the first side plate and the second side plate being slidably disposed within the drive carrier so as to dispose the disk drive within the drive carrier.

4. An optical disk drive module installed in a flat panel display personal computer for lifting up and lowering a disk drive, the flat panel display personal computer comprising a flat panel display, the optical disk drive module comprising:
   a chassis module disposed at a rear side of the flat panel display;
   a drive carrier rotatably disposed in the chassis module; and
   a cover fixed outside of the disk drive and slidably fastened within the drive carrier so as to position the disk drive in the drive carrier;
   wherein when the drive carrier swings away from the chassis module, the optical disk drive module will lower the disk drive to expose the disk drive below the flat panel display; and when the drive carrier moves toward the chassis module, the optical disk drive module will lift up the disk drive to position the disk drive at the rear side of the flat panel display.

5. The optical disk drive module of claim 4 wherein:
   the chassis module comprises:
     a chassis body;
     a first side plate and a second side plate formed at two sides of the chassis body and movably fastened to the rear side of the flat panel display, the first side plate having a first aperture, the second side plate having a second aperture facing the first aperture;
     a first gearwheel disposed on an inner wall of the first side plate; and
     a second gearwheel disposed on an inner wall of the second side plate facing the first gearwheel, the first and second gearwheels having effectively equal radii D1; and
   the drive carrier comprises:
     a carrier body; and
     a first side plate and a second side plate formed at two sides of the carrier body, the first side plate having a first protruded portion inserted into the first aperture of the first side plate of the chassis module, the second side plate having a second protruded portion inserted into the second aperture of the second side plate of the chassis module.

6. The optical disk drive module of claim 5 wherein:
   the drive carrier further comprises:
     a first positioning hook positioned at an upper end of the first side plate, and a second positioning hook positioned at an upper end of the second side plate;
     a first gear disposed at one end of the first side plate for engaging with the first gearwheel; and
     a second gear disposed at one end of the second side place opposing the first gear for engaging with the second gearwheel, the first and second gears having effectively equal radii D2 which is larger than D1; and
   the cover comprises:
     a cover body having a first positioning slot for receiving the first positioning hook, and a second positioning slot for receiving the second positioning hook so as to fasten the cover within the drive carrier; and
     a first side plate and a second side plate formed at two sides of the cover and outside of the disk drive so as to fix the cover outside of the disk drive, the first side plate and the second side plate being slidably disposed within the drive carrier so as to dispose the disk drive within the drive carrier;
   wherein when the drive carrier rotates with respect to the first protruded portion and the second protruded portion to swing away from the chassis module, the optical disk drive module will lower the disk drive to expose the disk drive below the flat panel display; and when the drive carrier rotates with respect to the first protruded portion and the second protruded portion to swing toward the chassis module, the optical disk drive module will raise up the disk drive to position the disk drive at the rear side of the flat panel display.

7. A flat panel display personal computer comprising:
   a flat panel display;
   a computing module disposed on a rear side of the flat panel display and coupled to the flat panel display; and
   an optical disk drive module disposed at the rear side of the flat panel display for lifting up and lowering a disk drive, the optical disk drive module comprising:
     a chassis module disposed at the rear side of the flat panel display, the chassis module comprising:
       a chassis body;
       a first side plate and a second side plate formed at two sides of the chassis body and movably fastened to the rear side of the flat panel display, the first side plate having a first aperture, the second side plate having a second aperture facing the first aperture;
       a first gearwheel disposed on an inner wall of the first side plate; and
       a second gearwheel disposed on an inner wall of the second side plate facing the first gearwheel, the first and second gearwheels having effectively equal radii D1; and
     a drive carrier rotatably disposed in the chassis module for positioning the disk drive, the drive carrier comprising:
       a carrier body; and
       a first side plate and a second side plate formed at two sides of the carrier body, the first side plate having a first protruded portion inserted into the first aperture of the first side plate of the chassis module, the second side plate having a second protruded portion inserted into the second aperture of the second side plate of the chassis module;
     wherein when the drive carrier swings away from the chassis module, the optical disk drive module will lower the disk drive to expose the disk drive below the flat panel display; and when the drive carrier moves toward the chassis module, the optical disk drive module will lift up the disk drive to position the disk drive at the rear side of the flat panel display.

8. The flat panel display personal computer of claim 7 wherein:
   the drive carrier further comprises:
     a first positioning hook positioned at an upper end of the first side plate, and a second positioning hook positioned at an upper end of the second side plate;
     a first gear disposed at one end of the first side plate for engaging with the first gearwheel; and
     a second gear disposed at one end of the second side plate opposing the first gear for engaging with the second gearwheel, the first and second gears having affectively equal radii D2 which is larger than D1;
   wherein when the drive carrier rotates with respect to the first protruded portion and the second protruded portion to swing away from the chassis module, the optical disk drive module will lower the disk drive to expose the disk drive below the flat panel display; and when the drive carrier rotates with respect to the first protruded portion and the second protruded portion to swing toward the chassis module, the optical disk drive module will raise up the disk drive to position the disk drive at the rear side of the flat panel display.

9. The flat panel display personal computer of claim 8 further comprising a cover slidably fastened within the drive carrier, the cover comprising:

a cover body having a first positioning slot for receiving the first positioning hook, and a second positioning slot for receiving the second positioning hook so as to fasten the cover within the drive carrier; and a first side plate and a second side plate formed at two sides of the cover and outside of the disk drive so as to fix the cover outside of the disk drive, the first side plate and the second side plate being slidably disposed within the drive carrier so as to dispose the disk drive within the drive carrier.

\* \* \* \* \*